United States Patent

Itoh et al.

[11] Patent Number: 4,624,153
[45] Date of Patent: Nov. 25, 1986

[54] CONTINUOUSLY VARIABLE TRANSMISSION

[75] Inventors: Hiroshi Itoh; Mituhiko Okada, both of Toyota, Japan

[73] Assignee: Toyota Jidosha Kabushiki Kaisha, Japan

[21] Appl. No.: 561,066

[22] Filed: Dec. 13, 1983

[30] Foreign Application Priority Data

Dec. 13, 1982 [JP] Japan .................. 57-218150

[51] Int. Cl.$^4$ .................. F16H 37/08; F16H 37/00
[52] U.S. Cl. .................. 74/689; 74/695
[58] Field of Search .................. 74/674, 681, 688, 695, 74/689, 731; 192/3.23, 3.24

[56] References Cited

U.S. PATENT DOCUMENTS

| | | | |
|---|---|---|---|
| 2,164,818 | 7/1939 | Heyer et al. | 74/689 |
| 2,640,572 | 6/1953 | O'Brien | 74/731 |
| 3,203,277 | 8/1965 | General | 74/689 |
| 3,340,749 | 9/1967 | Magg et al. | 74/689 |
| 4,290,320 | 9/1981 | Abbott | 74/689 |
| 4,294,137 | 10/1981 | Piret et al. | 74/665 G |
| 4,304,150 | 12/1981 | Lupo et al. | 74/731 |
| 4,406,178 | 9/1983 | Gillade | 74/681 |

FOREIGN PATENT DOCUMENTS

| | | | |
|---|---|---|---|
| 0081260 | 6/1983 | European Pat. Off. | 74/688 |
| 56-90155 | 7/1981 | Japan | 74/689 |
| 57-129953 | 12/1982 | Japan | 74/689 |
| 57-204362 | 12/1982 | Japan | 74/695 |
| 1603633 | 11/1981 | United Kingdom | 74/689 |
| 1603853 | 12/1981 | United Kingdom | 74/689 |

Primary Examiner—Kenneth J. Dorner
Assistant Examiner—D. Wright
Attorney, Agent, or Firm—Parkhurst and Oliff

[57] ABSTRACT

A continuously variable transmission for obtaining a large transmission range ratio between the input shaft and the output shaft. The transmission employs a planetary gear unit, and an engine torque is transmitted through a gear train or a V-belt transmission to the planetary gear unit.

16 Claims, 2 Drawing Figures

CONTINUOUSLY VARIABLE TRANSMISSION

BACKGROUND OF THE INVENTION

The present invention relates to a continuously variable transmission which continuously varies the transmission ratio (transmission ratio being defined as the RPM or speed ratio) between a driving pulley and a driven pulley, and more particularly to a compacted continuously variable transmission used in a motorized vehicle.

It is known that one type of a continuously variable transmission has a V-belt extending between a driving and driven pulley and controls the number of the revolutions of a driven pulley by varying the size of a V-shaped opening(s) in both the driving and driven pulleys. Thus, the position of the belt on the pulley and the effective diameter of the pulley can be varied, and it is possible to continuously vary the RPM ratio between the input shaft and the output shaft in the continuously variable transmission.

It is also known to form a continuously variable transmission means from a predetermined number of metallic hoops, upon which longitudinally shiftable V-shaped block members are mounted, the members are linked together and extend around the total circumference of the hoops. The driving force of the driving pulley is then transmitted to the driven pulley by the movement of the V-shaped block members.

In the above-described transmission, the distance between the driving and driven pulley varies when the effective diameter of the pulleys vary, to obtain wide transmission ratios. The variation in the distance between the driving and driven pulley results in an increase in the size of the continuously variable transmission. Additionally, if the effective diameter of the driven pulley becomes very small, in order to obtain the wide transmission ratios, the radius of the minimum curve on the V-belt must accordingly be very small, which results in a short useful life for the V-belt.

SUMMARY OF THE INVENTION

The present invention was made in view of the foregoing background and to overcome the foregoing drawbacks. It is accordingly an object of this invention to provide a compact continuously variable transmission which enables a wide transmission ratio between a driven pulley and a driving pulley.

To attain the above object, a continuously variable transmission according to the present invention has a variable transmission means and a planetary gear unit. The variable transmission means has a driving pulley connected with an input shaft, a driven pulley connected with the planetary gear unit, and a belt member spanning the pulleys. The planetary gear unit receives the torque from the input shaft through the driving and driven pulleys and also through a torque transmitting means provided between the input shaft and the planetary gear unit. Further, a clutch means is provided between the input shaft and the planetary gear unit to connect or disconnect the torque from the input shaft to the planetary gear unit. A brake means is provided between the input shaft and the planetary gear unit to stop the rotation of a planetary carrier when the clutch means is disconnected. The rotation of the input shaft is then transmitted through the planetary gear unit with a continuously variable ratio to the output shaft.

The above object, features and advantages of the present invention will become more apparent from the following description of the preferred embodiment taken in conjunction with the accompanying drawings.

DETAILED DESCRIPTION OF THE PREFERRED EMBODIMENT

The present invention is described in detail with reference to the accompanying drawings which illustrate the embodiments of the present invention.

Figure 1:
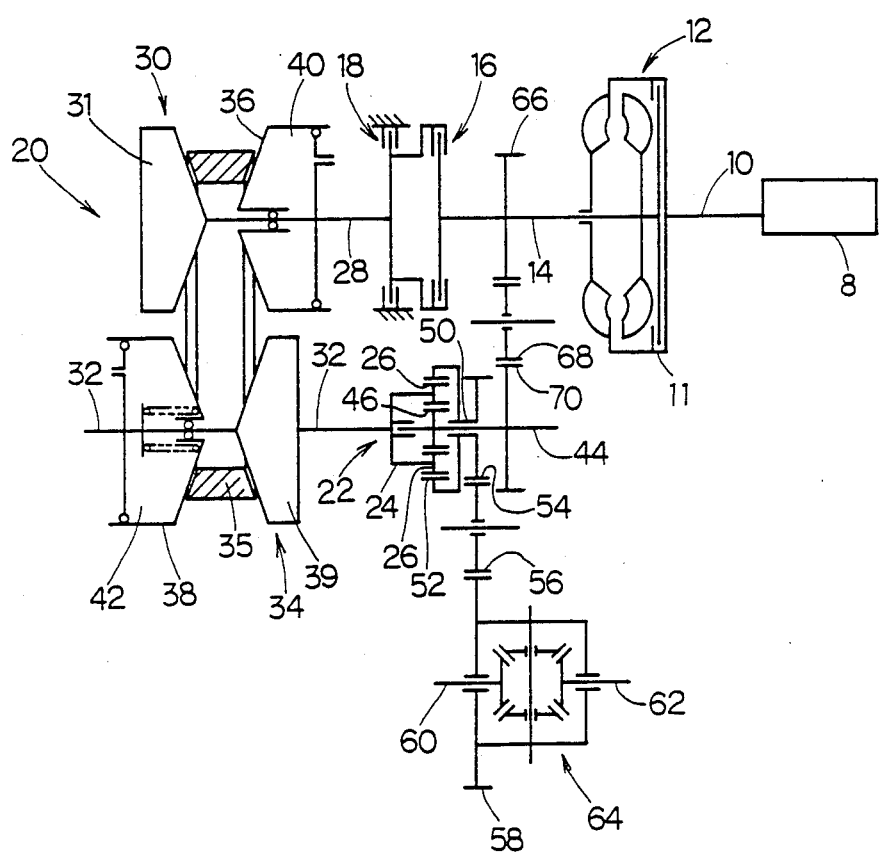
FIG. 1 is a schematic view of a continuously variable transmission according to the first embodiment of the present invention.

FIG. 1 shows a schematic view of a continuously variable transmission according to the first embodiment as applied in a motorized vehicle.

The torque of an engine 8 is transmitted through a fluid coupling 12 to an input shaft 14. The numeral 11 designates a lock-up clutch. When the lock-up clutch 11 is engaged, the crank shaft 10 is mechanically connected with the input shaft 14 at a position between the fluid coupling 12 and a clutch 16. A torque converter may be substituted for the fluid coupling. A gear 66 is mounted on the input shaft 14. The gear 66 meshes with an idler gear 68 mounted on an idler shaft, which is provided in a parallel relationship with the input shaft 14. The idler gear 68 meshes with a gear 70 mounted on a shaft 44, which is provided in a parallel relationship with the input shaft 14. Thus, the torque of the input shaft 14 is always transmitted through the idler gear 68 and the gear 70 to the shaft 44.

The input shaft 14 is connected through the clutch 16 to a shaft 28, which is an input shaft to a continuously variable transmission 20. The rotation of the input shaft 28 is forcibly stopped when a brake 18 is actuated. The brake 18 is provided at a position between the input shaft 14 and the continuously variable transmission 20. The continuously variable transmission 20 has a driving pulley 30, a driven pulley 34 and a V-belt 35 spanning between the pulleys 30 and 34. The driving pulley 30 has a non-movable member 31, fixed to and rotatable with the input shaft 28, and a movable member 36 axially movable on and rotatable with the input shaft 28. The movable member 36 is designed to be axially displaced toward and away from the non-movable member 31 by the pressure of a hydraulic cylinder 40, exerted upon it. As a result of the displacement of the movable member 36, the width of the V-shaped opening between the non-movable member 31 and the movable member 36 can be adjusted, thereby changing the effective diameter of the driving pulley 30.

Similarly, the driven pulley 34 has a non-movable member 39 fixed to and rotatable with an output shaft 32, and a movable member 38, axially movable on and rotatable with the output shaft 32. The movable member 38 is designed to be axially displaced toward and away from the non-movable member 39 by the pressure of a hydraulic cylinder 42, exerted upon it. Consequently, the width of the V-shaped opening between the movable member 38 and the non-movable member 39 can be adjusted, thereby changing the effective diameter of the driven pulley 34.

In accordance with the change of the effective diameter, the ratio $\gamma$ ($\gamma = \omega_{28}/\omega_{32}$) can be continuously varied within a predetermined range. When $\omega_{28}$ is the RPM of the input shaft 28, and $\omega_{32}$ is the RPM of the output shaft 32. The ratio $\gamma$ can be varied by changing the effective diameter of the pulleys 30 and 34.

A V-belt 35 expands between the V-shaped openings of the driving pulley 30 and the driven pulley 34. The V-belt 35 has a plurality of endless metallic carriers superimposed on each other and V-shaped metallic blocks mounted on the carriers.

The torque of the output shaft 32 is inputted through a planetary carrier 24 to a planetary gear unit 22. The planetary gear unit 22 has a sun gear 46, mounted on the shaft 44, pinion gear 26 meshed with the sun gear 46, a planetary carrier 24 rotatably supporting pinion gears 26, and a ring gear 52 internally meshed with the pinion gears 26. The pinion gears 26 can be rotated about their own axes. A sun gear 46 is also driven by the torque transmitted through the gears 66, 68 and 70 and into the shaft 44. The planetary carrier 24, is connected to the pinion gears 26 at one end thereof, and is integral with the output shaft 32 of the continuously variable transmission 20 at another end thereof. The carrier 24 can be rotatable around the sun gear 46. The ring gear 52 is fixed to a sleeve 50. The sleeve 50 is mounted on the shaft 44 allowing for the sleeve 50 to rotate around the shaft 44.

When the clutch 16 is engaged, the torque of the input shaft 14 is transmitted through the continuously variable transmission 20 to the planetary gear unit 22, and rotates the pinion gears 26 around the sun gear 46. When the clutch 16 is disengaged, the torque of the input shaft 14 is not transmitted through the continuously variable transmission 20 to the planetary gear unit 22. In this condition, the brake 18 stops the rotation of the planetary carrier 24 and holds the planetary carrier 24 in a stationary position.

The sleeve 50 forms an input shaft for the continuously variable transmission 20. A gear 54 is fixed to the sleeve 50. The gear 54 meshes with an idler gear 56, which meshes with a final gear 58. The final gear 58 is rotatably mounted around a drive shaft 60 or a drive shaft 62, which are connected with wheels of the vehicle. The final gear 58 is concentrically mounted with the drive shafts 60 and 62, which are mounted on a differential gear unit 64.

In operation, when an operator drives a vehicle in a forward direction, the brake 18 is not actuated and the clutch 16 is actuated by a hydraulic control system (not shown in drawings). In this condition, the input shaft 14 is connected through the clutch 16 to the input shaft 28. The torque of the crank shaft 10 is transmitted through the input shaft 14 and a gear train 66, 68 and 70 to the sun gear 46. Further, the torque of the crank shaft 10 is transmitted through the input shaft 14, the shaft 28, the continuously variable transmission 20 and the output shaft 32 to the planetary carrier 24. The planetary gear unit 22 transmits the torque of the sun gear 46 and the pinion gears 26 through the ring gear 52, the sleeve 50 and a gear train 54, 56 and 58 to the differential gear unit 64.

In this condition, the planetary gear unit 22 is controlled by the following equation:

$$(1+\rho)\omega_c = \rho\omega_s + \omega_R \tag{1}$$

where, $\rho = Z_S/Z_R$ and $Z_S$ is the number of teeth on the sun gear, and $Z_R$ is the number of teeth on the ring gear $\omega_c$ = the RPM of the planetary carrier 24 (i.e., the RPM of the rotation of the pinions 26 around the sun gear 46).

$\omega_s$ = the RPM of the sun gear 46

$\omega_R$ = the RPM of the ring gear 52

The transmission ratio "i" is indicated by the following relationship:

$$i = \omega_{in}/\omega_{out} \tag{2}$$

where, $\omega_{in}$ = the RPM of the shaft 14

$\omega_{out}$ = the RPM of the sleeve 50

Next, the transmission ratio of the continuously variable transmission 20 is represented by "$\gamma$". The gear ratio of the gear train having gears 66, 68 and 70 is indicated as "$R_T$" and the RPM's $\omega_c$, $\omega_s$ and $\omega_R$ are represented by the following:

$$\omega_c = \omega_{in}/\gamma \tag{3}$$

$$\omega_s = \omega_{in}/R_T \tag{4}$$

$$\omega_R = \omega_{out} \tag{5}$$

The above-described equations (3), (4) and (5) are substituted into equation (1) and result in the following:

$$i = \frac{1}{(1+\rho)/\gamma - \rho/R_T} = \frac{\gamma}{(1+\rho) - \gamma\rho/R_T} \tag{6}$$

If the denominator in the equation (6) is adjusted to be positive when the vehicle is moving in a forward direction and the value of the denominator in equation (6) is a value between zero and one, the transmission ratio "i" becomes a value which is greater than "$\gamma$".

For example, suppose that the transmission is operated under the following conditions;
where;

$$\gamma = \tfrac{1}{2} \to 2$$

$$R_T = 1$$

$$\rho = 0.5$$

In this condition, the ratio "i" is a value between 0.4 to 4. Therefore, the transmission ratio "i" of the continuously variable transmission 20 is enlarged. Thus, it is possible to enlarge the transmission ratio range of the continuously variable transmission without increasing the size of the continuously variable transmission 20.

When the operator drives the vehicle in a reverse direction, the brake 18 is actuated and the clutch 16 is disengaged by a hydraulic control system (not shown in drawings). In this condition, the input shaft 28, is disconnected from the input shaft 14 and is forced to stop by the actuation of the brake 18. This results in stopping the rotation of the planetary carrier 24. Hence, the sleeve 50 and the ring gear 52 are rotated by the torque transmitted through the input shaft 14, the gear train 66, 68 and 70, the sun gear 46, and the pinion gears 26, all of which have a predetermined transmission ratio.

In this condition, the RPM of the planetary carrier 24 approaches zero and eventually stops. Equation (1) is then modified as shown in the following:

$$i_{rev.} = \omega_{in}/\omega_{out} = R_T/\rho \qquad (7)$$

When the ratio "$\rho$" equal 0.5 and the ratio of the gear train $R_T$ is 1, the transmission ratio "i" in the reverse driving condition equals 2. In this embodiment, the torque of the input shaft 14 is transmitted through a gear train 66, 68 and 70 to the shaft 44. The torque of the input shaft 14 may be transmitted through a chain or a belt extended between the shafts 14 and 44. The clutch 16 and the brake 18 may be provided on the output shaft 32 instead of the input shaft.

Figure 2:
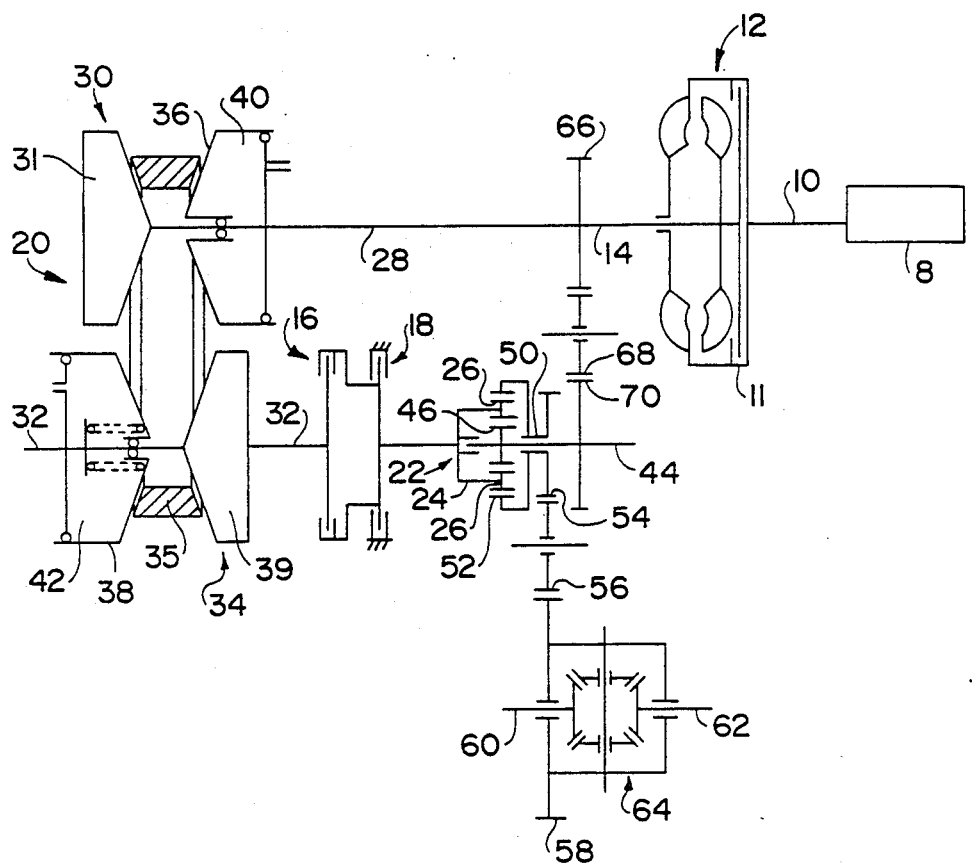
FIG. 2 is a schematic view of a continuously variable transmission according to the second embodiment of the present invention.

FIG. 2 shows the second embodiment of the present invention. The difference between the first embodiment and the second embodiment is the positions of the clutch 16 and the brake 18. According to the second embodiment, the clutch 16 and the brake 18 are provided between the driven pulley 39 and the planetary gear unit 22.

While the present invention has been described in its preferred embodiment, it is to be understood that the invention is not limited thereto, and may be otherwise embodied within the scope of the following claims.

What is claimed is:

1. A continuously variable transmission for transmitting a torque from an engine to a final reduction gear, comprising:
   an input shaft connected with the engine at one end thereof;
   a continuously variable transmission means having a driving pulley with a fixed member and a movable member, the movable member being actuated by an hydraulic cylinder to form a V-shaped opening between the fixed member and movable member, a driven pulley with another fixed member and another movable member, said another movable member being similarly actuated by another hydraulic cylinder to form another V-shaped opening between said another fixed member and said another movable member, and a belt member spanning the pulleys providing for a continuously variable transmission ratio;
   a planetary gear unit including a sun gear, a plurality of pinion gears which mesh with the sun gear and are connected with the driven pulley and a ring gear which meshes with said plurality of pinion gears;
   a rotation transmitting means for transmitting rotation of the input shaft to the planetary gear unit, said rotation transmitting means being provided between the input shaft and the planetary gear unit and including a shaft connected with the sun gear of said planetary gear unit and a first gear connected with the input shaft, the first gear being located between the engine and the continuously variable transmission means;
   a clutch means for engaging or disengaging the first gear with the driving pulley, said clutch means positioned between the first gear and the driving pulley;
   brake means provided between the clutch means and the driving pulley, said brake means for stopping the rotation of the continuously variable transmission means;
   a connection means, one side of which is connected with the ring gear of said planetary gear unit; and
   a differential gear means connected with another side of said connection means, said differential gear means having an output shaft, whereby when said clutch means engages the input shaft with the driving pulley, the rotation of the input shaft is transmitted through two paths to said planetary gear unit, so that the transmission ratio range of said continuously variable transmission means is enlarged and the output shaft is driven in a forward rotational direction, and when said brake means stops the rotation of the continuously variable transmission means, the rotation of the input shaft is transmitted through only one path to said planetary gear unit, so that the transmission ratio range of said continuously variable transmission is fixed and the output shaft is driven in a reverse rotational direction.

2. The continuously variable transmission of claim 1, wherein the planetary gear unit further comprises:
   a planetary carrier for supporting the pinion gears, connected with the driven pulley and being rotatable around the sun gear.

3. The continuously variable transmission of claim 1, wherein the rotation transmitting means comprises the first gear being connected with the input shaft and a last gear being connected with the sun gear of the planetary gear unit.

4. The continuously variable transmission of claim 3, wherein an idler gear is provided in a meshing relationship between said first gear and said last gear.

5. The continuously variable transmission of claim 1, wherein a fluid coupling is provided on the input shaft at a position between the engine and the rotation transmitting means.

6. The continuously variable transmission of claim 1, wherein a torque converter is provided on the input shaft at the position between the engine and the rotation transmitting means.

7. The continuously variable transmission of claim 5, wherein a lock-up clutch for mechanically transmitting a rotation from the engine to the input shaft is provided between the fluid coupling and the input shaft.

8. The continuously variable transmission of claim 6, wherein a lock-up clutch for mechanically transmitting a rotation of the engine to the input shaft is provided between the torque converter and the input shaft.

9. A continuously variable transmission for transmitting a torque from an engine to a final reduction gear, comprising:
   an input shaft connected with the engine at one end thereof;
   a continuously variable transmission means having a driving pulley with a fixed member and a movable member, the movable member being actuated by an hydraulic cylinder to form a V-shaped opening between the fixed member and movable member, the driving pulley being connected with the input shaft, a driven pulley with another fixed member and another movable member, said another movable member being similarly acuated by another hydraulic cylinder to form another V-shaped opening between said another fixed member and said another movable member, and a belt member spanning the pulleys providing for a continuously variable transmission ratio;
   a planetary gear unit including a sun gear, a plurality of pinion gears which mesh with the sun gear, a ring gear which meshes with the plurality of pinion gears and a planetary carrier for supporting the pinion gear, said planetary carrier being connected with the driven pulley and being rotatable around the sun gear;

a rotation transmitting means for transmitting rotation of the input shaft to the planetary gear unit, said rotation transmitting means being provided between the input shaft and the planetary gear unit and including a shaft connected with the sun gear of said planetary gear unit and a first gear connected with the input shaft, the first gear being located between the engine and the continuously variable transmission means;

a clutch means for engaging or disengaging the driven pulley with the planetary carrier of said planetary gear unit, said clutch means positioned between the driven pulley and the planetary carrier;

brake means provided between the clutch means and the planetary carrier of said planetary gear unit, said brake means for stopping the rotation of the planetary carrier;

a connecting means, one side of which is connected with the ring gear of said planetary gear unit; and a differential gear means connected with another side of said connection means; said differential gear means having an output shaft, whereby when said clutch means engages the driven pulley with the planetary carrier, the rotation of the input shaft is transmitted through two paths to said planetary gear unit, so that the transmission ratio range of said continuously variable transmission means is enlarged and the output shaft is driven in a forward rotational direction, and when said clutch means disengages the driven pulley with the planetary carrier, the rotation of the input shaft is transmitted through only one path to said planetary gear unit, so that the transmission ratio range of said continuously variable transmission means is fixed and the output shaft is driven in a reverse rotational direction.

10. The continuously variable transmission of claim 9, wherein the rotation transmitting means comprises the first gear connected with the input shaft and a last gear connected with the sun gear of the planetary gear unit.

11. The continuously variable transmission of claim 10, wherein an idler gear is provided in a meshing relationship between said first gear and said last gear.

12. The continuously variable transmission of claim 9, wherein a fluid coupling is provided on the input shaft at a position between the engine and the rotation transmitting means.

13. The continuously variable transmission of claim 9, wherein a torque converter is provided on the input shaft at a position between the engine and the rotation transmitting means.

14. The continuously variable transmission of claim 12, wherein a lock-up clutch for mechanically transmitting a rotation from the engine to the input shaft is provided between the fluid coupling and the input shaft.

15. The continuously variable transmission of claim 13, wherein a lock-up clutch for mechanically transmitting a rotation of the engine to the input shaft is provided between the torque converter and the input shaft.

16. A continuously variable transmission for transmitting a torque from an engine to a final reduction gear, comprising:

an input shaft connected with the engine at one end thereof;

a continuously variable transmission means having a driving pulley with a fixed member and a movable member, the movable member being actuated by an hydraulic cylinder to form a V-shaped opening between the fixed member and movable member, a driven pulley with another fixed member and another movable member, said another movable member being similarly actuated by another hydraulic cylinder to form another V-shaped opening between said another fixed member and said another movable member, and a belt member spanning the pulleys providing for a continuously variable transmission ratio;

a planetary gear unit including a sun gear, a plurality of pinion gears which mesh with the sun gear, said plurality of pinion gears being connected with the driven pulley, and a ring gear meshed with the plurality of pinion gears;

a rotation transmitting means for transmitting rotation of the input shaft to the planetary gear unit, said rotation transmitting means being provided between the input shaft and the planetary gear unit, and including a shaft connected with the sun gear of said planetary gear unit;

a clutch means for engaging or disengaging the input shaft with the driving pulley, said clutch means positioned between the input shaft and the driving pulley;

brake means provided between the clutch means and the driving pulley, said brake means for stopping the rotation of the continuously variable transmission means;

a connection means, one side of which is connected with the ring gear of said planetary gear unit; and a differential gear means connected with another side of said connection means, said differential gear means having an output shaft, whereby when said clutch means engages the input shaft with the driving pulley, the rotation of the input shaft is transmitted through two paths to said planetary gear unit, so that the transmission ratio range of said continuously variable transmission means is enlarged and the output shaft is driven in a forward rotational direction, and when said brake means stops the rotation of the continuously variable transmission means, the rotation of the input shaft is transmitted through only one path to said planetary gear unit, so that the transmission ratio range of said continuously variable transmission means is fixed and the output shaft is driven in a reverse rotational direction.

* * * * *